United States Patent Office 3,093,664
Patented June 11, 1963

3,093,664
4-HALO-6-DEHYDRO AND 4-HALO-1,6-BIS DEHYDRO DERIVATIVES OF 17α-HYDROXY PROGESTERONE
John A. Edwards, Howard J. Ringold, and Fred A. Kincl, Mexico City, Mexico, assignors, by mesne assignments, to Syntex Corporation, a corporation of Panama
No Drawing. Filed Nov. 30, 1959, Ser. No. 19,438
Claims priority, application Mexico, Nov. 28, 1958
15 Claims. (Cl. 260—397.4)

This invention relates to certain new cyclopentanophenanthrene derivatives.

More particularly, it relates to the novel 4-halo-6-dehydro and 4-halo-1,6-bis-dehydro derivatives of 17α-hydroxyprogesterone, and their esters, represented by the following formula:

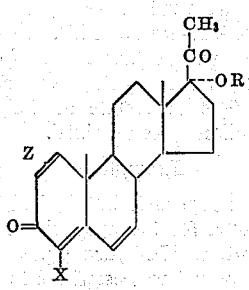

wherein Z is a member of the group consisting of a single and a double carbon-to-carbon bond, X is a member of the group consisting of chlorine and bromine, and R is a member of the group consisting of hydrogen and the acyl radical of a hydrocarbon carboxylic acid having from 1 to 12 carbon atoms and being saturated or unsaturated, of straight, branched, cyclic or mixed straight (branched)-cyclic chain, optionally substituted with functional groups such as hydroxyl, acyloxy (of 1 to 12 carbon atoms), alkoxy (of 1 to 8 carbon atoms) or halogen (fluorine, chlorine or bromine). Among others, typical esters of such acids are the acetate, propionate, butyrate, hemisuccinate, caproate, benzoate, trimethylacetate, phenoxyacetate, phenylpropionate, cyclopentylpropionate and β-chloropropionate.

The new compounds which are the object of the present invention, are valuable drugs which inhibit ovulation.

For their preparation, we used as starting materials 4-chloro- and 4-bromo-17α-hydroxyprogesterone described by Ringold and Rosenkranz, in patent application Serial No. 647,503, filed on March 21, 1957, their 17-esters described by Edwards, Ringold and Rosenkranz, in patent application Serial No. 811,019, filed on May 5, 1959, or the 1-dehydro derivatives of such compounds, also described in the latter patent application.

The new compounds according to the invention were produced by means of a process illustrated in the reaction diagram given below and described thereafter in detail.

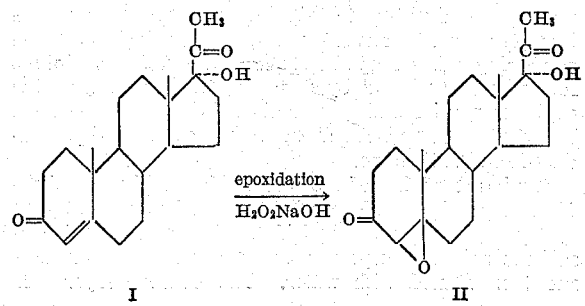

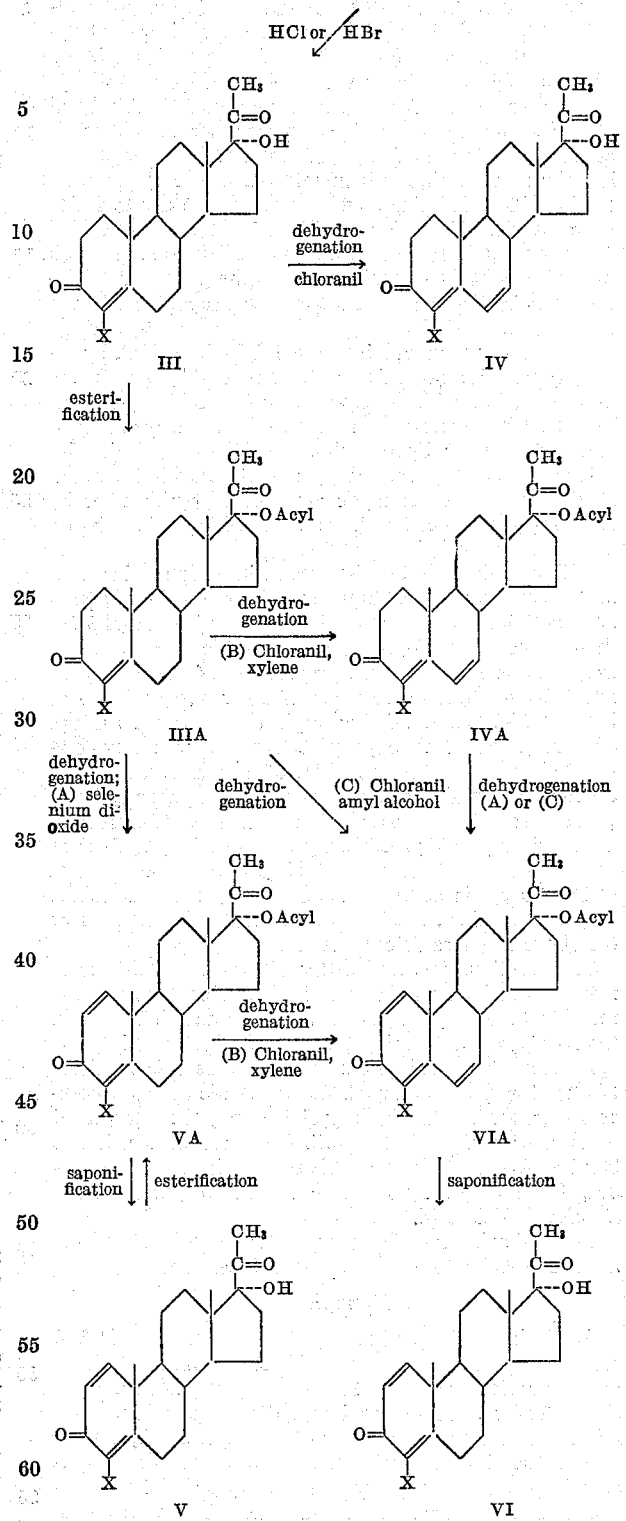

As preparatory steps in the above-illustrated process, the well known and conventional starting compound I, 17α-hydroxy-progesterone, is epoxidized with the aid of hydrogen peroxide and sodium hydroxide to the epoxide II and the latter is then halogenated in its acetonic or the like solution with the aid of concentrated hydrochloric or hydrobromic acid to the corresponding 4-chloro or 4-bromo compound III, in which X represents either chorine or bromine as the case may be.

Esterification of compound III is carried out in a conventional manner, for instance with the anhydride of the respective acid and p-toluenesulfonic acid, and esters of the general Formula IIIA are obtained.

The esters VA of the $\Delta^{1,4}$-dienes are obtained from compounds IIIA by dehydrogenation with selenium dioxide, t-butanol and pyridine, as described in patent application 811,019 supra, and the free $\Delta^{1,4}$-dienes V by conventional saponification from esters VA.

In order to introduce a single additional double bond at C-6,7 into 4-halo-17α-hydroxyprogesterone III or its esters IIIA to obtain compounds IV and IVA, the steroid is refluxed with chloranil in mixture with ethyl acetate-acetic acid or in mixture with xylene; in order to introduce two double bonds at C-1,2 and C-6,7, the esterified $\Delta^4$-compound is refluxed with chloranil in mixture with n-amyl alcohol to obtain directly the esterified $\Delta^{1,4,6}$-compounds VIA and upon conventional saponification the free compounds VI.

Alternatively, we obtained the 1,4,6-trienes VIA by refluxing the above-mentioned 1,4-dienes VA, that is, the 1-dehydro-derivatives of the 4-halo-17α-hydroxy-progesterones, with chloranil in mixture with the solvents mentioned above, or by refluxing the 4,6-dienes IVA with selenium dioxide, preferably in mixture with t-butanol, in the presence of catalytic amounts of pyridine, or by refluxing the same 4,6-dienes with chloranil in mixture with n-amyl alcohol.

Although the object of the present invention is the preparation of the novel 4-chloro and 4-bromo-$\Delta^{4,6}$-pregnadien-17α-ol-3,20-diones and $\Delta^{1,4,6}$-pregnatrien-17α-ol-3,20-diones and their 17-esters, the above-described process may also be applied to the preparation of the 6-dehydro and 1,6-bis-dehydro derivatives of other 4-halo(chloro or bromo)-$\Delta^4$-3-ketones, for example of the 4-halo analogs of cortexone (or desoxycorticosterone), of cortexolone (or Reichstein's substance "S"), of cortisone and of hydrocortisone, which compounds may be optionally halogenated at C-9 and/or substituted at C-16 (α-hydroxyl, α-methyl or β-methyl, α-alkoxy or α-fluorine) and/or at C-2 (α-alkyl), and/or at C-21 (fluorine) and/or have at C-16,17 a cyclic acetal or ketal group, as well as to the preparation of such dehydro derivatives of the esters of the above-enumerated compounds.

The reactions involved in the above-described process may be modified within wide limits. For example, the reaction time may be varied without much influence in the result; for introducing the third double bond into the 4,6-dienes with selenium dioxide, a solvent different from t-butanol may be employed, such as acetic acid or another lower tertiary alcohol; pyridine may be substituted by another basic catalyst; the introduction of the double bond at C-1 may also be achieved by biochemical methods, for example by incubation with *Corynebacterium simplex* ATCC 6946.

The following specific examples serve to illustrate but are not intended to limit the present invention.

*Example I*

A solution of 10 g. of 17α-hydroxy-progesterone in 300 cc. of methanol was cooled to 0° C. and mixed with 20 cc. of previously cooled 32% hydrogen peroxide solution and 50 cc. of a 4% sodium hydroxide solution. The mixture was kept standing for 48 hours at 0° C., poured into water, extracted with methylene dichloride, the dichloride solution was evaporated to dryness and the residue crystallized from acetone-hexane. There was thus obtained 7.8 g. of 4β,5β-epoxido-pregnane-17α-ol-3-20-dione.

1 g. of this compound was dissolved in 20 cc. of acetone and mixed with 1 cc. of concentrated aqueous solution of hydrochloric acid. The mixture was kept for 4 hours at room temperature and then poured into water. The product was filtered, washed to neutral, dried under vacuum and crystallized from acetone-hexane, thus giving 800 mg. of 4-chloro-17α-hydroxy-progesterone.

A mixture of 5 g. of 4-chloro-17α-hydroxyprogesterone prepared in the above manner, 10 g. of chloranil, 75 cc. of ethyl acetate and 25 cc. of acetic acid was refluxed under an atmosphere of nitrogen for 96 hours. The cooled mixture was washed with cold aqueous 10% sodium hydroxide solution until the washings were colorless, the solution was dried over anhydrous sodium sulfate and the ethyl acetate was evaporated. Chromatography of the residue on neutral alumina afforded 4-chloro-$\Delta^{4,6}$-pregnadien-17α-ol-3,20-dione.

*Example II*

To a solution of 1 g. of 4-chloro-17α-hydroxy-progesterone prepared as described in Example I, in 50 cc. of anhydrous benzene there was added 2 cc. of acetic anhydride and 200 mg. of p-toluenesulfonic acid and the mixture was kept at room temperature for 24 hours and then diluted with water; the benzene layer was separated and washed with aqueous 5% sodium carbonate solution and with water to neutral, dried over anhydrous sodium sulfate and evaporated to dryness. The residue crystallized from acetone-hexane to yield 4-chloro-17α-hydroxy-progesterone 17-acetate, M.P. 177–179° C.

The latter ester was further treated in the same manner as described when using the free 4-chloro compound in Example I. The 17-acetate of 4-chloro-$\Delta^{4,6}$-pregnadien-17α-ol-3,20-dione was obtained.

*Example III*

Example I was repeated, but hydrobromic acid solution was substituted for the hydrochloric acid and there was obtained 4-bromo-17α-hydroxy-progesterone.

The latter compound was esterified to its 17-acetate by the first step described in Example II.

A mixture of 5 g. of the resulting 4-bromo-17α-hydroxyprogesterone 17-acetate, 10 g. of chloranil and 50 cc. of xylene was refluxed for 16 hours under an atmosphere of nitrogen, cooled, washed with 5% aqueous sodium bicarbonate solution and water, dried over anhydrous sodium sulfate and the xylene was evaporated under reduced pressure. By chromatography of the residue on neutral alumina there was obtained the 17-acetate of 4-bromo-$\Delta^{4,6}$-pregnadien-17α-ol-3,20-dione.

*Example IV*

4-chloro-17α-hydroxy-progesterone was esterified with caproic anhydride by following the procedure described in Example II.

A mixture of 5 g. of the resulting 17-caproate of 4-chloro-17α-hydroxyprogesterone, 0.4 g. of selenium dioxide and 0.3 cc. of pyridine was refluxed under an atmosphere of nitrogen for 72 hours and then filtered through celite, washing the filter with hot butanol; the filtrate and washings were combined and evaporated to dryness under reduced pressure; the residue was dissolved in acetone, treated with decolorizing charcoal, refluxed for half an hour, cooled, filtered and evaporated to dryness. The residue was purified by chromatography on neutral alumina. There was thus obtained 4-chloro-$\Delta^{1,4}$-pregnadien-17α-ol-3,20-dione 17-caproate.

A mixture of 1 g. of 4-chloro-$\Delta^{1,4}$-pregnadien-17α-ol-3,20-dione 17-acetate with 10 cc. of a methanol solution of sodium methoxide, prepared from 160 mg. of sodium and absolute methanol, was stirred at 20° C. under an atmosphere of nitrogen for 72 hours. It was then poured into 50 cc. of aqueous saturated sodium chloride solution containing a few drops of acetic acid and the precipitate formed was collected by filtration, washed with a little cold water, dried and recrystallized from acetone-hexane. There was thus obtained the free 4-chloro-$\Delta^{1,4}$-pregnadien-17α-ol-3,20-dione.

A mixture of 6 g. of the free 4-chloro-$\Delta^{1,4}$-pregnadien-17α-ol-3,20-dione, 100 cc. of anhydrous benzene, 10 g. of cyclopentylpropionic anhydride and 3 g. of p-toluenesulfonic acid was kept at room temperature for 3 days and then diluted with water. The benzene layer was separated, washed several times with 5% aqueous sodium carbonate solution and water, dried over anhydrous sodium sulfate and the benzene was evaporated. Crystallization of the residue from acetone-hexane yielded the cyclopentylpropionate of 4-chloro-Δ$^{1,4}$-pregnadien-17α-ol-3,20-dione.

5 g. of the above compound was treated with chloranil in mixture with xylene, exactly as described in Example II, thus producing the cyclopentylpropionate of 4-chloro-Δ$^{1,4,6}$-pregnatrien-17α-ol-3,20-dione.

*Example V*

By following the method of esterification described in the preceding example, 4-bromo-17α-hydroxy-progesterone prepared as described in Example III was converted into its iso-butyrate by reaction with the anhydride of iso-butyric acid; in turn, this iso-butyrate was converted into the iso-butyrate of 4-bromo-Δ$^{4,6}$-pregnadien-17α-ol-3,20-dione by the reaction with chloranil described in Example I.

5 g. of the above compound was refluxed with selenium dioxide, essentially following the method of Example IV, to produce the isobutyrate of 4-bromo-Δ$^{1,4,6}$-pregnatrien-17α-ol-3,20-dione.

*Example VI*

5 g. of the acetate of 4-chloro-Δ$^{4,6}$-pregnadien-17α-ol-3,20-dione obtained as described in Example II was refluxed with chloranil in mixture with n-amyl alcohol, in accordance with the procedure described in Example IV, thus furnishing the acetate of 4-chloro-Δ$^{1,4,6}$-pregnatrien-17α-ol-3,20-dione.

We claim:
1. A compound of the general formula:

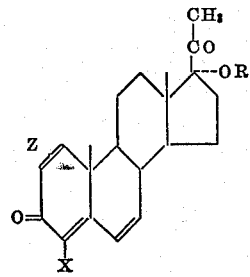

wherein Z is a member of the group consisting of a single and a double carbon-to-carbon bond, X is a member of the group consisting of chlorine and bromine, and R is a member of the group consisting of hydrogen and the acyl radical of a hydrocarbon carboxylic acid having from 1 to 12 carbon atoms.

2. 4-chloro-Δ$^{4,6}$-pregnadien-17α-ol-3,20-dione.
3. An ester of 4-chloro-Δ$^{4,6}$-pregnadien-17α-ol-3,20-dione having an hydrocarbon carboxylic acyl group which contains up to 12 carbon atoms.
4. 4-chloro-Δ$^{1,4,6}$-pregnatrien-17α-ol-3,20-dione.
5. An ester of 4-chloro-Δ$^{1,4,6}$-pregnatrien-17α-ol-3,20-dione having an hydrocarbon carboxylic acyl group which contains up to 12 carbons atoms.
6. 4-bromo-Δ$^{4,6}$-pregnadien-17α-ol-3,20-dione.
7. An ester of 4-bromo-Δ$^{4,6}$-pregnadien-17α-ol-3,20-dione having an hydrocarbon carboxylic acyl group which contains up to 12 carbon atoms.
8. 4-bromo-Δ$^{1,4,6}$-pregnatrien-17α-ol-3,20-dione.
9. An ester of 4-bromo-Δ$^{1,4,6}$-pregnatrien-17α-ol-3,20 dione having an hydrocarbon carboxylic acyl group which contains up to 12 carbon atoms.
10. A compound as described in claim 1 wherein R is the acyl group of propionic acid.
11. A compound as described in claim 1 wherein R is the acyl group of acetic acid.
12. A compound as described in claim 1 wherein R is the acyl group of isobutyric acid.
13. A compound as described in claim 1 wherein R is the acyl group of hemisuccinic acid.
14. A compound as described in claim 1 wherein R is the acyl group of caproic acid.
15. A compound as described in claim 1 wherein R is the acyl group of cyclopentylpropionic acid.

References Cited in the file of this patent
UNITED STATES PATENTS 2,883,379   Moreland et al. _____ Apr. 21, 1959
2,895,969   Ringold et al. _____ July 21, 1959

OTHER REFERENCES

Kirk et al.: "Journal Chemical Soc." (1956), pages 1184–6.
Kirk et al.: "Journal Chemical Soc." (1956), pages 627–9.